United States Patent Office 3,794,686
Patented Feb. 26, 1974

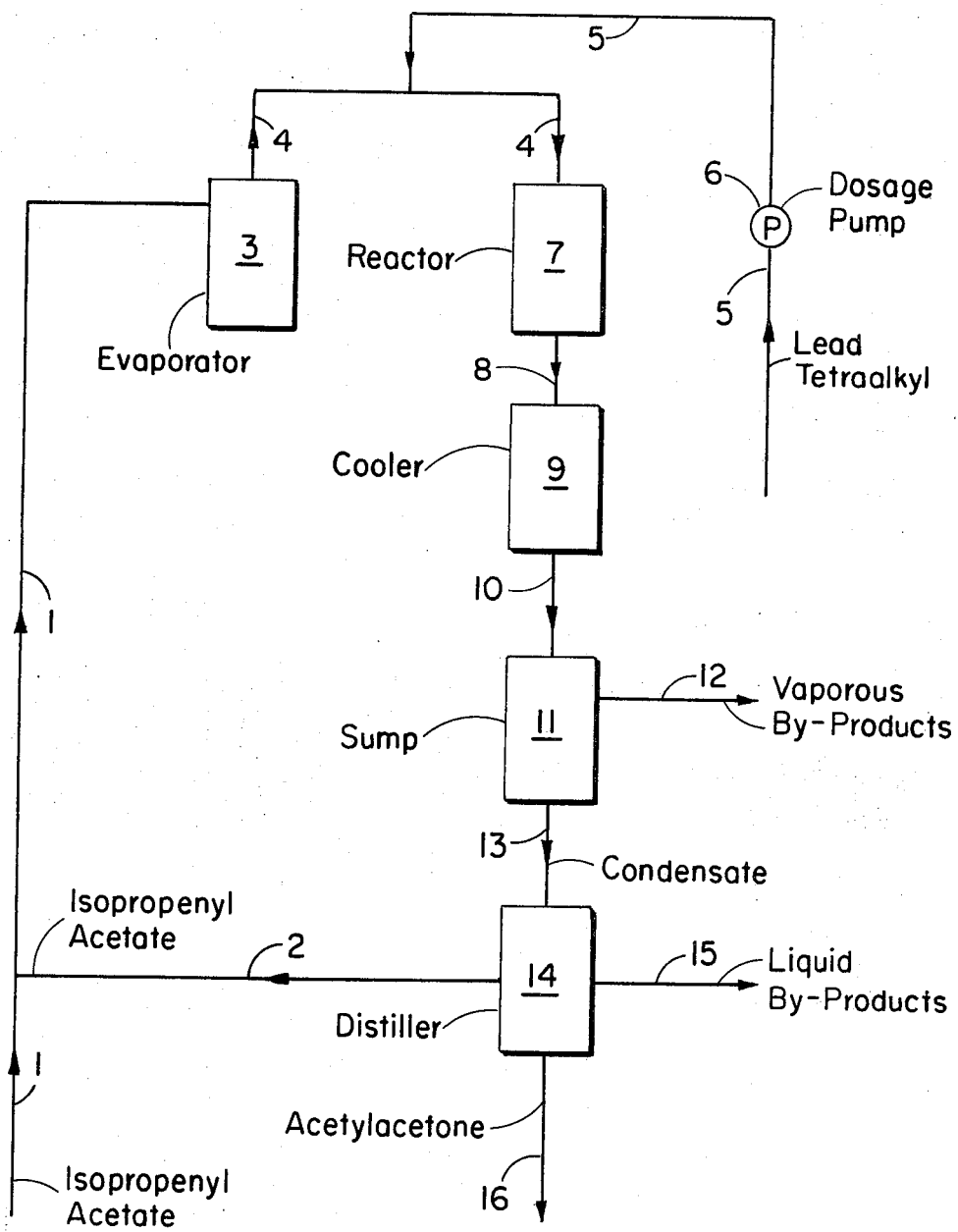

3,794,686
PROCESS FOR CONTINUOUSLY PRODUCING ACETYLACETONE
Hellmuth Spes and Gerhard Kunstle, Burghausen-Obb, and Herbert Siegl, Haiming-Obb, Germany, assignors to Wacker-Chemie G.m.b.H., Munich, Bavaria, Germany
Filed Sept. 27, 1971, Ser. No. 183,855
Claims priority, application Germany, Sept. 25, 1970, P 20 47 320.5
Int. Cl. C07c 49/20
U.S. Cl. 260—595                5 Claims

ABSTRACT OF THE DISCLOSURE

A process for continuously producing acetylacetone which comprises thermally rearranging vaporous isopropenyl acetate at a temperature of 300–600° C. in the presence of at least one lead tetraalkyl of the formula

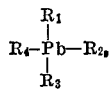

where the alkyl groups $R_1$, $R_2$, $R_3$ and $R_4$ are equal or different and denote methyl or ethyl, and then cooling, condensing and distilling the reaction vapors.

---

Several methods are known for producing acetylacetone by thermal rearrangement of isopropenyl acetate.

According to the method of pat. No. 2,395,800, isopropenyl acetate is passed in the vapor phase through a reactor in which a reaction temperature of about 500° C. is maintained and which consists of an empty chromium/iron, nickel/chromium, V₂A-pipe or a ceramic pipe. The hot reaction vapors are chilled in a subsequent cooler and condensed. From the condensate the acetylacetone is obtained, for instance by distillation. According to this method with an approximate isopropenyl acetate conversion of about 53% one obtains a yield of acetylacetone of about 45%, calculated on the isopropenyl acetate used, and about 86% calculated on the isopropenyl acetate converted.

A disadvantage of this method is that the soot created during the conversion and the tarry byproducts and decomposition products necessitate a frequent cleaning of the reaction and cooling system, which does not permit a continuous working process. Moreover, this reduces the throughput, the conversion and the yield; and the formation of undersirable pyrolysis products, e.g. acetone and ketene, is facilitated.

According to another method (see German Pat. No. 1,001,249) the conversion reaction is carried out in the presence of metallic molybdenum. The latter is introduced into the reaction chamber either finely dispersed on an inert carrier, or in the form of shavings of an alloy which consists, for instance, of molybdenum/iron with 1.8 to 10% molybdenum.

By these measures one can practically prevent the soot formation in the reaction chamber and increase the conversion of isopropenyl acetate to about 81% and the yield of acetylacetone, calculated on the isopropenyl acetate used, to about 65%.

However, the desired continuity is not achieved by this method. The cooling system gets crust-covered and clogged by tarry byproducts which impair the heat exchange and cause a continuous reduction of the chilling effect. Moreover, the rearrangement reaction must also be interrupted.

We have now discovered a process for continuously producing acetylactone by thermal rearrangement of vaporous isopropenyl acetate at 300–600° C. The process is characterized by the fact that the rearrangement reaction is performed in the presence of one or more lead tetraalkyls of the general formula

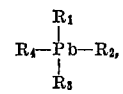

where the alkyl groups $R_1$, $R_2$, $R_3$ and $R_4$ are equal or different and denote methyl or ethyl, and then cooling, condensing and distilling the reaction vapors.

Suitable lead tetraalkyl compounds are, for instance: lead tetramethyl, lead trimethylethyl, lead dimethyldiethyl, lead methyltriethyl or lead tetraethyl.

Preferred are lead tetraethyl or lead tetramethyl which represent economical technical products.

According to the kind of lead tetraalkyls used and the rearrangement temperatures, their concentration may differ. However, generally small quantities are sufficient. Preferably a concentration of 0.0001 to 0.01% by weight of lead tetraalkyl, calculated on the isopropenyl acetate applied, is used.

The lead tetraalkyls can be pure or in the form of commercial products containing hydrocarbon bromides, e.g. ethylene bromide or dibromethane, and they can be introduced into the isopropenyl acetate before or after evaporation.

The invention is described in connection with the accompanying drawing which is a diagrammatic illustration of a system for carrying out the process.

Through a pipeline 1 a continuous flow of fresh and recycled isopropenyl acetate (the latter from line 2) is piped into an evaporator 3 and evaporated therein at normal pressure. The isopropenyl acetate vapor is piped through line 4 into a reactor 7 consisting of an empty pipe made of refined steel, whose internal temperature is 520° C. At a point before the reactor 7, a small quantity of lead tetraalkyl is added continuously to the isopropenyl acetate vapor by means of a dosaging device 6 through line 5. The hot, vaporous rearrangement product leaving the reactor through the short line 8 is piped into a subsequent cooler 9, where it is chilled and condensed. The condensate is piped through line 10 into the sump 11 from which the byproducts which are vaporous at normal temperature can escape through line 12. The condensate is piped through line 13 into the refining device 14. While one obtains pure acetylacetone through line 16, unconverted isopropenyl acetate is recycled through line 2. The liquid byproducts formed during the rearrangement reaction are sluiced out through line 15.

With equal success, however, the lead tetraalkyl can also be admixed to the isopropenyl acetate before evaporation. But in that case it is necesary to use an evaporation arrangement which facilitates a trouble-free transportation of the lead tetraalkyl with the isopropenyl acetate vapor.

It is surprising that by a small addition of lead tetraalkyl, even in the absence of molybdenum, one can almost completely prevent the carbon deposit in the rearrangement reactor. Moreover, any crust formation or clogging of the cooling system is completely eliminated, whereby the continuity of the process is assured and the technology of the process is improved. Also, the process of the invention can achieve a higher volume/time yield and a higher conversion, the selectivity can be increased and thereby the formation of byproducts harmful to the yield can be limited.

Moreover, in spite of the use of lead tetraalkyls, the lead content of the pure acetylacetone produced by the process of the invention, is not increased, as established by spectral analysis.

EXAMPLE

The apparatus shown in the drawing consists of a precipitation evaporator 3, a dosage pump, an electrically heated reactor 7 (a V$_2$A-pipe 60 cm. long, with an inside diameter of 15 mm.), a coil cooler 9 with a diameter of 5 mm., a collecting vessel or sump 11, and a distilling apparatus 14. Into the evaporator 3 397.8 g. of a mixture consisting of 347.9 fresh and 49.9 g. recycled isopropenyl acetate are piped hourly through line 1 and completely evaporated. Into the vaporous isopropenyl acetate with a temperature of about 106° C., 0.04 g. of lead tetraethyl containing 35.72% by weight dibromethane is piped hourly by means of the dosage pump 6 through line 5 at a descending spot of the crossover pipe 4 before the reactor 7, and piped into the reactor 7 together with the isopropenyl acetate vapor. The internal temperature in the reactor 7 is maintained at about 520° C. The hot reaction vapors are piped through the short line 8 into the cooler 9, chilled, the resulting condensate is cooled to about 17 to 20° C. and piped on through line 10 to the collection vessel 11. From the latter the byproducts of the rearrangement which are vaporous under normal conditions, can escape through line 12. Obtained hourly are about 12.6 g. of gaseous byproducts, consisting mainly of carbon dioxide, methane and ketene. The yield of condensate is about 385 g. per hour. The latter is continuously piped through line 13 into the distilling apparatus 14 and there it is purified partly at normal pressure, partly in a moderate vacuum, by fractional distillation. Through line 15 the byproducts which are liquid at normal pressure, particularly acetone, acetic acid, or acetic acid anhydride and small quantities of higher condensation products of the acetone are sluiced out. Through line 2 about 50 g. of unconverted isopropenyl acetate are carried out per hour and recycled through line 1 into the evaporator 3. Through line 16 one obtains about 285 g. of pure acetylacetone per hour.

With a volume/time yield of about 4.1 volume parts of reaction mixture per hour per volume part, one achieves an isopropenyl acetate conversion of 87.4%. The yield of pure acetylacetone is 82% calculated on the isopropenyl acetate converted and 71.7% of the isopropenyl acetate used.

No soot deposit in the reactor or crust formation or clogging in the cooler occur even after several weeks' continuous operation.

Practically the same result is obtained by using the following lead tetraalkyls and lead tetraalkyl mixtures instead of the lead tetraethyl containing dibromethane:

Lead tetraethyl, lead tetramethyl, lead trimethylethyl, lead dimethyldiethyl, lead methyltriethyl, mixtures of lead tetraethyl/lead methyldiethyl/lead trimethylethyl, lead tetraethyl/lead tetramethyl or lead tetraethyl/lead tetramethyl/dibromethane.

The invention claimed is:

1. Process for continuously producing acetylacetone which comprises thermally rearranging vaporous isopropenyl acetate at a temperature of 300–600° C. in the presence of at least one lead tetraalkyl of the formula

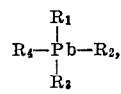

where the alkyl groups R$_1$, R$_2$, R$_3$ and R$_4$ are the same or different and denote methyl or ethyl, and then cooling the reaction vapors to obtain a condensate and distilling said condensate to recover acetylacetone.

2. Process according to claim 1, where R$_1$, R$_2$, R$_3$ and R$_4$ are equal and denote a methyl group.

3. Process according to claim 1, where R$_1$, R$_2$, R$_3$ and R$_4$ are equal and denote an ethyl group.

4. Process according to claim 1, where R$_1$, R$_2$, R$_3$ and R$_4$ are different and denote a methyl and ethyl group.

5. Process according to claim 1, in which the quantity of lead tetraalkyl used is 0.0001 to 0.01% by weight, calculated on the isopropenyl acetate used.

References Cited

UNITED STATES PATENTS 2,395,800   3/1946   Boese et al. _____ 260—595 X

FOREIGN PATENTS 795,843   5/1958   Great Britain _____ 260—595

BERNARD HELFIN, Primary Examiner

J. H. REAMER, Assistant Examiner